No. 11,938. Reissued Oct. 15, 1901.

L. W. LUELLEN.

VOTING MACHINE.

(Application filed Apr. 24, 1901.)

3 Sheets—Sheet 1.

Witnesses:
Walter S. Coffin
Nathan C. Lombard 2nd.

Inventor:
Lawrence W. Luellen,
by Lombard & Cobb
Attys

THE NORRIS PETERS CO., WASHINGTON, D. C.

No. 11,938. Reissued Oct. 15, 1901.

L. W. LUELLEN.

VOTING MACHINE.

(Application filed Apr. 24, 1901.)

3 Sheets—Sheet 2.

Witnesses:
Walter S. Coffin
Nathan C. Lombard 2nd

Inventor:
Lawrence W. Luellen
by Lombard & Cobb.
Attys.

THE NORRIS PETERS CO., WASHINGTON, D. C.

No. 11,938. Reissued Oct. 15, 1901.

L. W. LUELLEN.

VOTING MACHINE.

(Application filed Apr. 24, 1901.)

3 Sheets—Sheet 3.

Witnesses:
Waller S. Coffin
Nathan C. Lombard 2nd

Inventor:
Lawrence W. Luellen,
by Lombard & Cobb.
Attys

THE NORRIS PETERS CO., WASHINGTON, D. C.

UNITED STATES PATENT OFFICE.

LAWRENCE W. LUELLEN, OF OLATHE, KANSAS.

VOTING-MACHINE.

SPECIFICATION forming part of Reissued Letters Patent No. 11,938, dated October 15, 1901.

Original No. 651,874, dated June 19, 1900. Application for reissue filed April 24, 1901. Serial No. 57,200.

*To all whom it may concern:*

Be it known that I, LAWRENCE W. LUELLEN, a citizen of the United States, residing at Olathe, in the county of Johnson and State of Kansas, have invented certain new and useful Improvements in Voting-Machines; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to voting-machines, having for its object the provision of a simple and reliable machine of this class; and it consists in the various novel features hereinafter particularly described and claimed.

Figure 1:
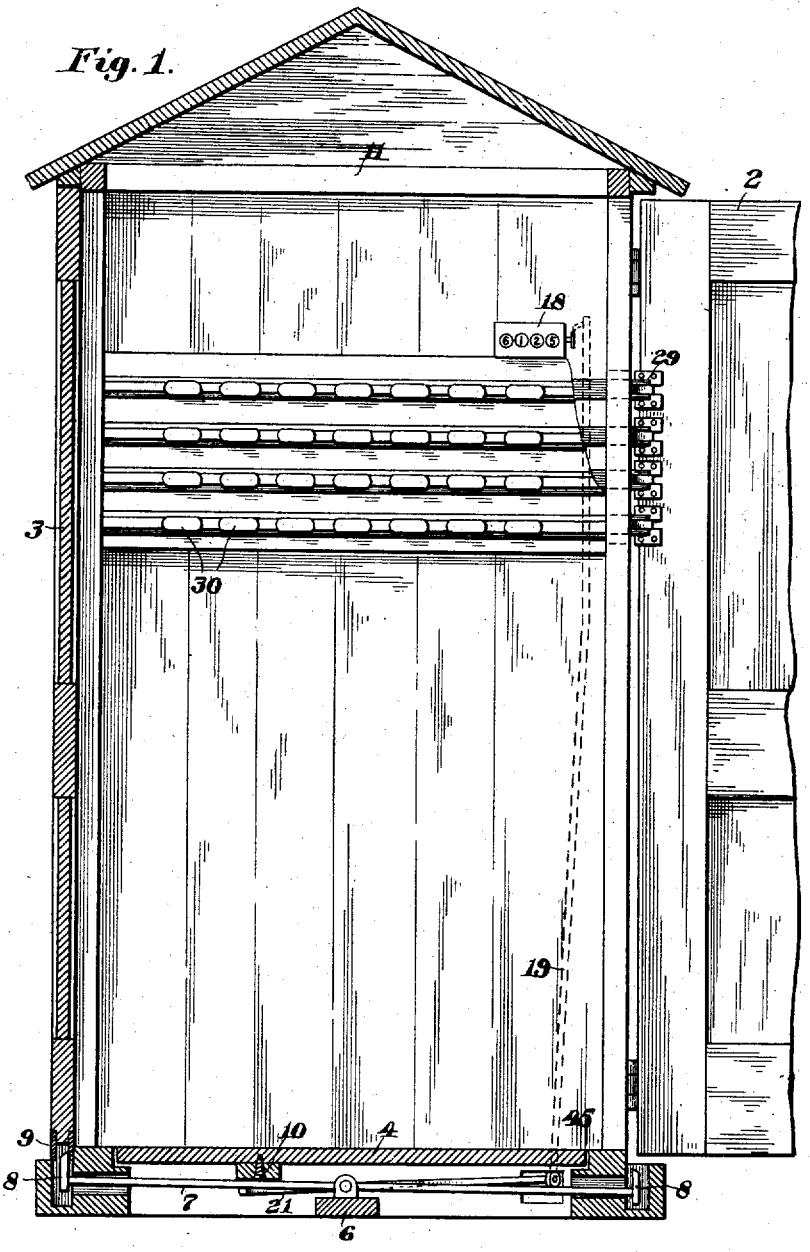
Figure 2:
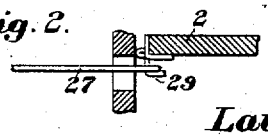
Figure 3:
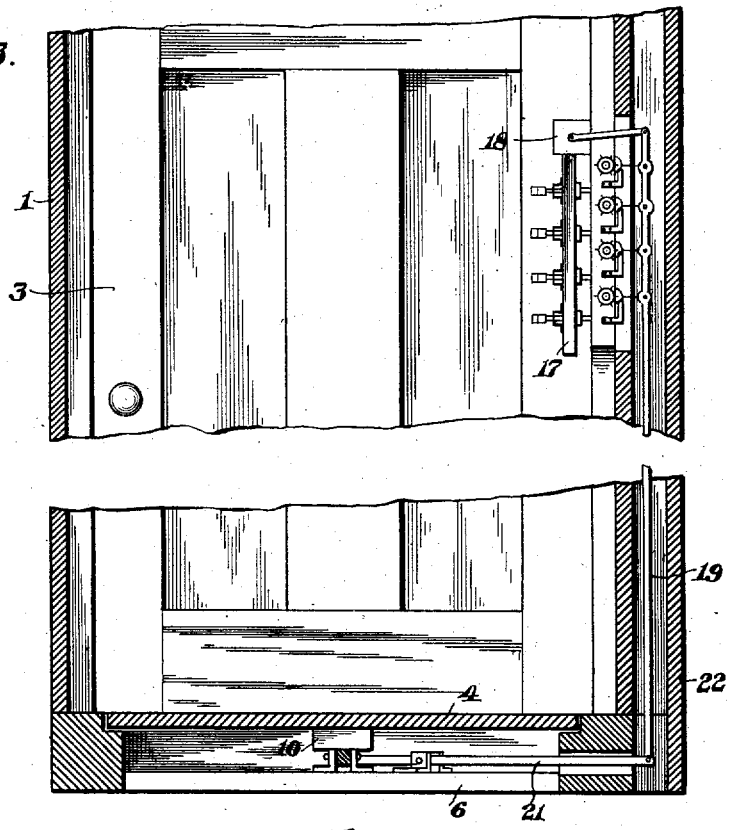
Figure 4:
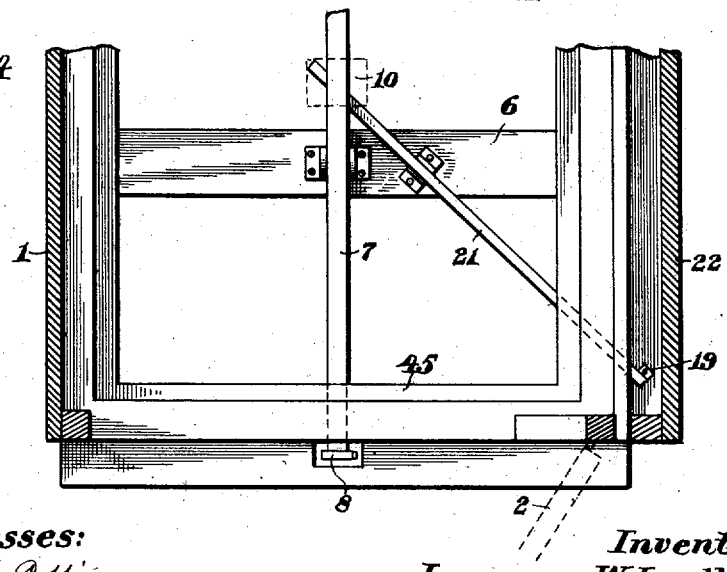
Figure 5:
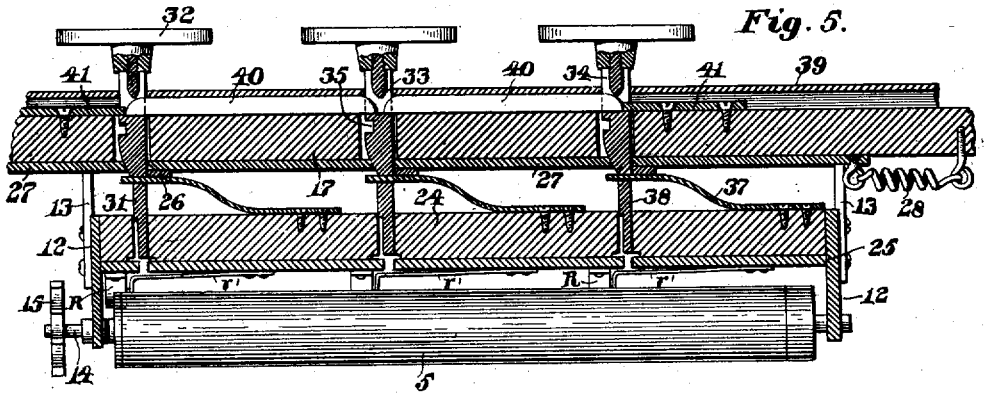
Figure 6:
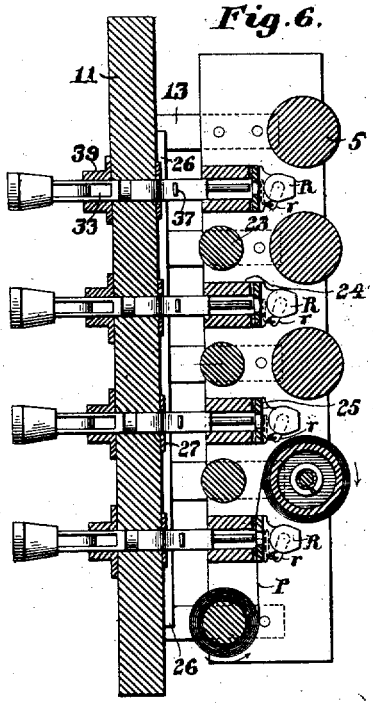
Figure 7:
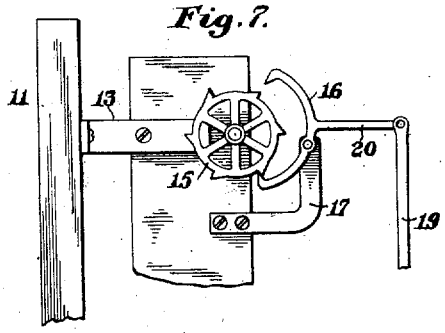
Figure 8:
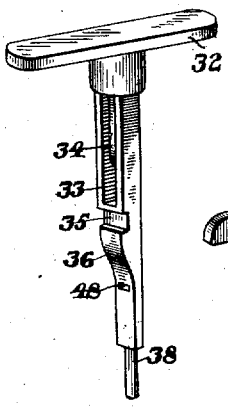
Figure 9:
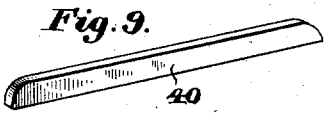

Referring to the accompanying drawings, forming a part of this specification, and wherein like characters of reference indicate similar parts throughout, Figure 1 is a vertical sectional view of my improvement, showing the entrance-door swung open. Fig. 2 is an enlarged sectional view of a locking-strip, with its engaging hook, as they appear when the door is opened. Fig. 3 is a broken sectional view of the booth looking toward the exit-door. Fig. 4 is a horizontal sectional view of the lower part of the booth with the platform removed. Fig. 5 is a horizontal sectional view of the recording mechanism. Fig. 6 is a vertical sectional view thereof. Fig. 7 is a side elevation of the roll-escapement. Fig. 8 is a perspective view of a key detached, and Fig. 9 is a similar view of one of the sliding locking-dogs.

In the drawings, 1 represents a booth provided with an entrance-door 2 at one side and an exit-door 3 at the opposite side and having for its floor a movable platform 4, which may fit within rabbets 45, formed in the frame. The beam or cross-bar 6 extends across the lower portion of the booth and has pivoted thereon the lever 7, which projects through the openings adjacent to the doors and is provided at its ends with catches 8, preferably beveled, as shown, extending upwardly to engage the lower edge of the doors, plates 9 being shown as attached thereto to contact with the catches. A block 10 is preferably secured to the under side of the platform and bears on the inner arm of lever 7, so that the weight of a person on said platform will cause the block to force one end of the lever 7 downward to release the exit-door and the other end of the lever 7 upward to engage the entrance-door.

Over an opening in one side of the booth is secured a keyboard 11, preferably having end plates 12 attached to its rear side by means of the brackets 13. Rolls 5, which may be formed similarly to the ordinary spring-actuated curtain-roll, each have one of their ends non-rotatably mounted in one of the end plates and a ratchet-wheel 15 on their other end. With each of the ratchet-wheels 15 preferably coöperates an anchor-pawl 16, pivoted below its middle point to a bracket 17, secured to the end plate 12. A suitable registering mechanism 18 is supported on the keyboard 11, and a connecting-rod 19 is pivoted to the arm of said registering mechanism and to the horizontal arms 20 of the anchor-pawls and extends downwardly to the lower part of the booth, where it is pivoted to a lever 21, fulcrumed on the bar 6 and extending beneath the end of the lever 7, adjacent to the block 10, to be depressed thereby when a weight is on the platform. The connecting-rod 19 and other parts which extend behind the wall of the booth may be incased by a supplementary wall 22 for their protection. Supply-rolls 23, carrying webs P of paper, are journaled in the end plates 12 and are adapted to deliver the paper to the rolls 5 when a person steps upon the platform by reason of the lever 21 forcing the connecting-rod upwardly, thereby causing each anchor-pawl to allow a tooth of its ratchet-wheel to pass and move the rolls 5 through a partial revolution. Horizontal guide-bars 24 are secured to the end plates 12 between the feed-rolls 23 and are provided on their rear edges with die-strips 25, preferably of metal, having a series of openings adapted to axially register with larger rectangular openings in the guide-strips. Vertical retaining-strips 26 are secured to the back of the keyboard and have notches in their edges through which horizontal locking-strips 27 slide, said locking-strips each being provided with a series of preferably rectangular openings and having an eye or opening at one end and a spiral spring 28 connecting the other end with a suitable eye secured in the base-board. Hooks or projections 29 are secured at or near the edge of the entrance-door and engage the openings of the locking-strips to slide them through the retaining-strips against the action of the springs 28 when the entrance-door is opened. The hooks 29 may be formed of a single strip of sheet metal bent at right angles to lie against the edge of the door, with a tongue struck up therefrom and bent to engage the opening of a locking-strip. Keys 30, each formed with a shank 31 and a finger-piece or head 32, are arranged in substantially horizontal series or rows and slide through suitable openings in the keyboard, the shanks of the keys of each series preferably passing through the openings of a single locking-strip. The shank is provided with a slot 33 therethrough, containing a central beveled partition 34, the bevels forming cam-faces, and beyond the slot 33 and at substantially right angles thereto the shank is provided with a groove 35 and with a cam-face 36, the latter adapted to force the locking-strip against the action of its spring 28 as the key is pushed inward until the groove 35 is reached, when the locking-strip is forced into engagement with the groove 35 by said spring. Springs 37, which may be strap or leaf springs, are secured at one end to the guide-strips and are curved inward and have their other ends passing into openings 48 in the shanks of the keys beyond the cam-surfaces 36 to press the keys normally outward. The outer ends of said shanks are reduced in size, forming circular pins 38, to pass through the openings in the strips 25 and impress or perforate the paper P. Casings 39 are secured to the front of the keyboard 11, forming channels therewith, and are provided with openings through which the shanks of the keys pass, and in the channels are a number of sliding dogs 40 with beveled ends adapted to be engaged by the partitions 34 to force said dogs apart. Check-pieces 41 may be rigidly secured in the ends of each channel to limit the movement of the sliding dogs, and said dogs are of such length as to permit the passage of but one partition 34 at a time. Although these check-pieces have been shown, it is obvious that the contact of the dogs with the partition within the slots in the keys will at all times prevent the movement of more than one key at a time. Thus it will be seen that when one key is depressed it is locked in its position by the locking-strip engaging its groove 35, and its partition 34 will have forced its way between the dogs, crowding the others together, so that it becomes impossible to operate this or any other key until the locking-strip is released by again opening the entrance-door. The ends of the pins 38 may furnish a puncturing or marking means for making a record on the paper as it passes behind the guide-strips or may carry a marking means, and a registering mechanism R, having its actuating-lever $r$ held normally inward toward the keyboard by a spring $r'$, here shown as a leaf-spring attached to the rear of the die-strip, will be operated upon by the pins after they have passed through the paper to count the votes for each candidate as they are cast.

From the foregoing it will be seen that on opening the entrance-door the hooks 29 operate all of the locking-strips to permit any keys which have been pressed by the previous votes to their vote-recording position to return to their normal position, and when the voter steps upon the platform the lever 7 is swung to release the exit-door and raise the catch to engage the entrance-door, and at the same time the lever 21 operates the anchor-pawls to permit the rolls 5 to turn and the registering mechanism to register the voter. The voter then closes the entrance-door, so that the catch 8 locks the same, and proceeds to vote by depressing the key representing the chosen candidate in each horizontal line, and in doing so the votes are counted on their respective registers and recorded on their proper rolls, as above described. The registers show the total number of votes cast for each candidate, while the paper rolls furnish a permanent record of the same and also of the vote of every voter. Finally, the voter passes through the exit-door and closes the same, when the platform, being relieved of his weight, is elevated through the lever 21 by reason of the superior weight of the connecting-rod 19, when the lever 7 is thrown to its original position to lock the exit-door and release the entrance-door, and the booth is again ready to receive a voter.

Having described my invention, what I claim as new, and desire to secure by Letters Patent, is—

1. The combination with a booth, of entrance and exit doors thereto, a movable platform in the booth, and means operable by the platform for locking one door and unlocking the other.

2. The combination with a booth, of entrance and exit doors thereto, a movable platform in the booth, a lever beneath the platform actuated thereby, a registering mechanism, and means operable by the lever to actuate the registering mechanism.

3. The combination with a booth, of entrance and exit doors thereto, a movable platform in the booth, and a lever operated by the platform and adapted to engage the entrance-door at one end when in one position and the exit-door at the other end when in another position.

4. The combination with a booth, of entrance and exit doors thereto, a movable platform in the booth, a lever pivoted beneath the platform and operable thereby, and catches on the ends of the lever adapted to engage the entrance and exit doors respectively.

5. The combination with a booth, of a door therefor, a voting-machine within the booth provided with keys, locking-strips for said keys, and projections on the door in engagement with the locking-strips.

6. The combination with a booth, of a door therefor, a voting-machine within the booth provided with keys, locking-strips for said keys having openings, and projections on the door entering the openings in the locking-strips.

7. In a voting-machine, the combination with a keyboard, of keys having slots therethrough slidable in the keyboard, a casing on the keyboard forming a channel therewith, dogs confined within said channel and adapted to pass into the slots of the keys, and means on the keys to force said dogs apart.

8. In a voting-machine, the combination with a keyboard, of keys having slots therethrough slidable in the keyboard, a locking device adapted to lock said keys when depressed, dogs adapted to pass into the slots of the keys, said dogs being of such size as to permit but one key to pass at a time, and means on the keys for passing between said dogs.

9. In a voting-machine, the combination with a keyboard, of keys having slots therethrough slidable in the keyboard, a locking device adapted to lock said keys when depressed, a casing secured to the keyboard forming a channel, and dogs sliding in the channel and adapted to pass into the slots of the keys, said dogs being of such size as to permit but one key to pass at a time.

10. In a voting-machine, the combination with a keyboard, of keys having slots therethrough slidable in the keyboard, locking-dogs for said keys, and beveled partitions within the slots of the keys adapted to engage the ends of the dogs to force their way between the same, said dogs being of such size as to permit but one key to pass at a time.

11. In a voting-machine, the combination with a keyboard, of keys having slots therethrough slidable in the keyboard, locking-dogs for said keys, check-pieces limiting the movement of the dogs, and beveled partitions within the slots of the keys adapted to engage the ends of the dogs to force their way between the same.

12. In a voting-machine, the combination with a keyboard provided with openings, of keys extending through the openings, a locking-strip located at the rear of the keyboard, and locking-dogs located at the front thereof.

13. In a voting-machine, the combination with a keyboard provided with openings, of keys extending through the openings, a locking-strip located at the rear of the keyboard, and locking-dogs sliding in channels at the front thereof.

14. In a voting-machine, the combination with a keyboard provided with openings, of a series of keys extending through the openings, a strip located at the rear of the keyboard for locking any key in its vote-recording position, and dogs located at the front of the keyboard for locking the remaining keys against movement.

15. A key for voting-machines, comprising a portion provided with a slot extending therethrough and a cam-face situated within the slot.

16. A key for voting-machines, comprising a portion provided with a slot extending therethrough and a partition within the slot.

17. A key for voting-machines, comprising a portion provided with a slot extending therethrough, and a partition within the slot provided with a cam-face.

In testimony whereof I have signed my name to this specification in the presence of two subscribing witnesses.

LAWRENCE W. LUELLEN.

Witnesses:
WALTER E. LOMBARD,
SYLVANUS H. COBB.